United States Patent [19]

Ruscitti et al.

[11] Patent Number: 4,951,842

[45] Date of Patent: Aug. 28, 1990

[54] SEAL DEVICE FOR HAND PUMPS DISPENSING PASTE OR LIQUID PRODUCTS

[75] Inventors: Tommaso Ruscitti, Chieti; Davide Cutilli, Penne; Demetrio De Leonardis, Spoltore, all of Italy

[73] Assignee: S.A.R. S.p.A., Chieti, Italy

[21] Appl. No.: 353,014

[22] Filed: May 17, 1989

[30] Foreign Application Priority Data

May 24, 1988 [IT] Italy .............................. 20708 A/88

[51] Int. Cl.[5] .............................................. G01F 11/36

[52] U.S. Cl. ...................................... 222/321; 222/385

[58] Field of Search ............... 222/321, 341, 383, 385; 239/333

[56] References Cited

U.S. PATENT DOCUMENTS

| | | | |
|---|---|---|---|
| 3,949,906 | 4/1976 | Pettersen et al. | 222/153 |
| 4,010,874 | 3/1977 | Steiman | 222/321 |
| 4,022,354 | 5/1977 | Kotuby | 222/321 |
| 4,228,931 | 10/1980 | Ruscitti et al. | 222/321 |
| 4,252,507 | 2/1981 | Knickerbocker | 417/444 |
| 4,371,099 | 2/1983 | Foster et al. | 222/385 X |
| 4,434,916 | 3/1984 | Ruscitti et al. | 222/321 |
| 4,773,553 | 9/1988 | Van Brocklin | 215/272 |

*Primary Examiner*—Michael S. Huppert
*Attorney, Agent, or Firm*—Oblon, Spivak, McClelland, Maier & Neustadt

[57] ABSTRACT

A seal device for hand pumps for dispensing a substance such as paste or liquid products from bottles containing such products, wherein upper closure element of the pump is formed of elastically deformable plastic material. In an axial hole of the closure element there is provided an annular lip defining a circular aperture of diameter slightly less than that of a corresponding part of the pump stem to ensure a seal between the stem and closure element during pump operation even when the bottle is inclined or inverted, while allowing a certain quantity of air to be drawn in to compensate the quantity of substance dispensed. The stem collar has on its upper face a coaxial annular seal rib which engages against the lower face of the closure element under the thrust action of a spring to provide a seal when the pump is not under operation.

3 Claims, 2 Drawing Sheets

SEAL DEVICE FOR HAND PUMPS DISPENSING PASTE OR LIQUID PRODUCTS

BACKGROUND OF THE INVENTION

1. Field of the Invention

This invention relates to the seal device for hand pumps dispensing a predetermined quantity of a liquid product, including a product being in atomized or micronized form, or of a paste product contained in bottles or containers.

2. Discussion of the Background

Pumps of this type are well known and comprise essentially a main hollow body of circular cross-section composed of coaxial portions of different diameters and housing all the pump operating members, including a coaxial stem projecting from one of the open ends of the main body. Axially pressing this stem causes delivery of the product contained in the bottle, a certain quantity of air then taking the place of the dispensed product in the bottle.

As is well known, the top of the pump is closed by a plastic annular closure element having a coaxial hole through which the upper part of the pump stem projects to the outside, the hole having a diameter slightly greater than that of the corresponding upper part of the stem. The stem has a coaxial collar, against the lower face of which there rests the upper end of the helical spring of the pump, the upper face of the collar resting under the action of the spring against the lower face of said closure element, along the edge of the hole in this latter.

In known pumps it is usual to provide an annular rubber gasket carried by the collar upper face and disposed between this latter and the lower face of the closure element. This rubber gasket, which provides the seal, has certain drawbacks. In particular, precisely because of the fact that this gasket is of rubber it can alter the product to be dispensed or its smell. In addition, the products to be disposed often contain solvents which tend to dissolve the rubber of said gasket.

SUMMARY OF THE INVENTION

The object of the present invention is to obviate the aforesaid drawbacks of pumps with a rubber gasket, by providing a new seal device which is without rubber gaskets but which under all situations prevents product leakage when the bottle is inverted or inclined while allowing entry into the bottle of a determined quantity of air to compensate for the volume of the product dispensed by the manual operation of the pump.

Said objects are attained by the seal device according to the invention, characterised in that the upper closure element of the pump is of elastically deformable plastic material, there being provided in the axial hole of said element an annular lip defining a circular aperture of a diameter slightly less than that of the corresponding part of the pump stem to ensure a seal between the stem and closure element during pump operation even when the bottle is inverted or in any way inclined, while allowing the stem to slide in both directions and allowing a certain quantity of air to be drawn in from the outside to compensate for the quantity of substance delivered by the pump, the stem collar comprising on its upper face a coaxial annular seal rib which engages against the lower face of the closure element of elastic material under the thrust of the pump helical spring to provide a seal when the pump is not under operation.

This ensures a seal between the stem and upper closure element of the pump in any situation without requiring the use of the annular rubber gasket of pumps of the known art.

The invention is further characterised in that the pump closure element comprises a coaxial annular flange extending radially from it to form the seal gasket between the bottle mouth and the ring which fixes the pump to the bottle.

In this manner the problem of sealing the bottle comprising a dispensing pump is completely solved by means of a single element, ie a pump closure element which is of modified form and constructed of plastic material of suitable elasticity.

BRIEF DESCRIPTION OF THE DRAWINGS

The invention will be more apparent from the description of two embodiments thereof given hereinafter by way of example. In said description reference is made to the accompanying drawings in which.

DESCRIPTION OF THE PREFERRED EMBODIMENTS

Figure 1:
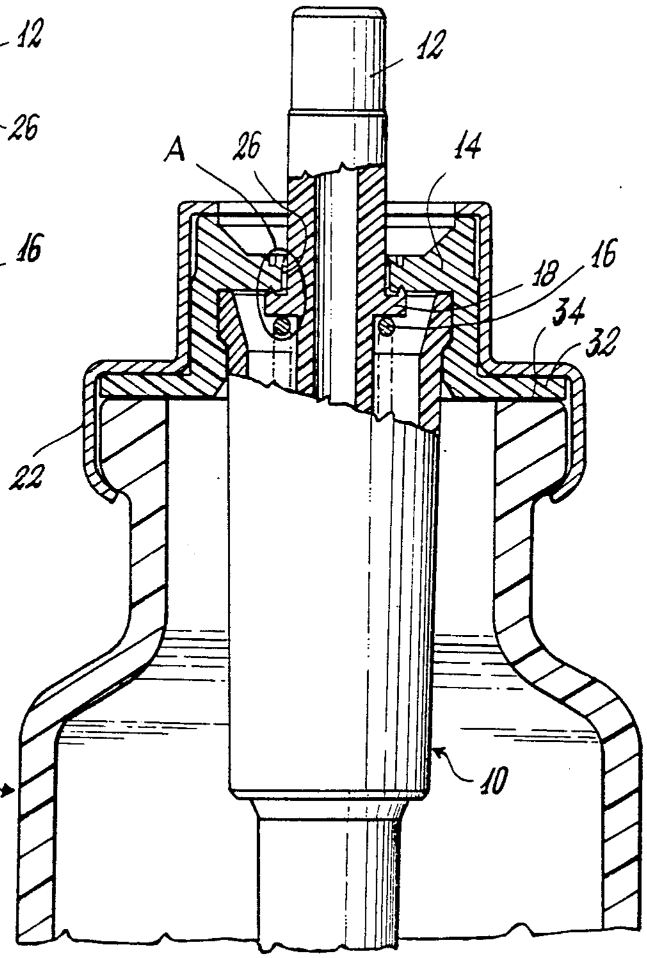
FIG. 1 is an axial vertical section through the neck of a bottle with the relative pump fitted to it by means of a metal ring, the seal device of the invention being visible.

From FIG. 1 it can be seen that the pump 10 has a stem 12 mobile in both vertical directions and urged upwards by a coaxial helical spring 16. The pump 10 is closed upperly by a closure element 14 which also acts as an upper travel limiting element for the stem 12, the collar 18 of the stem 12 resting against the lower side of the closure element 14 under the action of the spring 16.

The pump 10 is fixed to the mouth of the bottle 20 by a metal ring 22.

Figure 3:
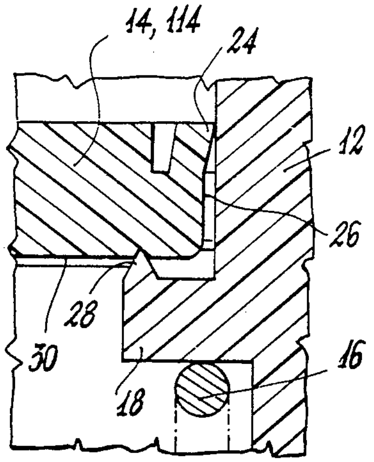
FIG. 3 shows the detail A of FIGS. 1 and 2 in an enlarged scale.

The seal device between the stem 12 and closure element 14 is shown more clearly in FIG. 3 which shows that the closure element 14 comprises an annular lip 24 extending towards the interior of the coaxial hole 26 in the closure element. The lip exerts on the stem 12 a circumferential pressure such that even if the bottle is inclined or inverted and the pump is operated by axially pressing the the stem 12, the lip 24 provides a seal to prevent the substance contained in the bottle 20 from leaking between the stem 12 and closure element 14.

In addition, the collar 18 of the stem 12 comprises on its upper surface an annular rib 28 of triangular cross-section. When the pump is not under operation (ie in the situation shown in the figures), the rib 28 is pressed by the action of the helical spring 16 against the lower face 30 of the closure element 14. This latter is of an elastic material (such as polyethylene (polythene) or polyethylene-copolymer) (polythene-copolymer) which is softer than the stem material, so that the annular edge of the rib 28 forms a seat in the surface 30 of the closure element 14. A perfect seal will thus be obtained between the closure element 14 and stem 12 when the pump is not under operation.

In the embodiment shown in FIG. 1, the closure element 14 also comprises a horizontal flange 32 located between the upper rim 34 of the bottle mouth and the corresponding part of the metal ring 22. Because of the relative softness of the material of which the closure element 14 is formed, the flange 32 functions as a seal gasket between said two elements.

In this manner the problem of providing a seal both between the closure element 14 and stem 12 and between the upper rim 34 of the mouth of the bottle 20 and the metal ring 22 is completely solved by means of a single element (the closure element 14) of suitable shape and of a suitable elastic material of appropriate hardness.

Figure 2:
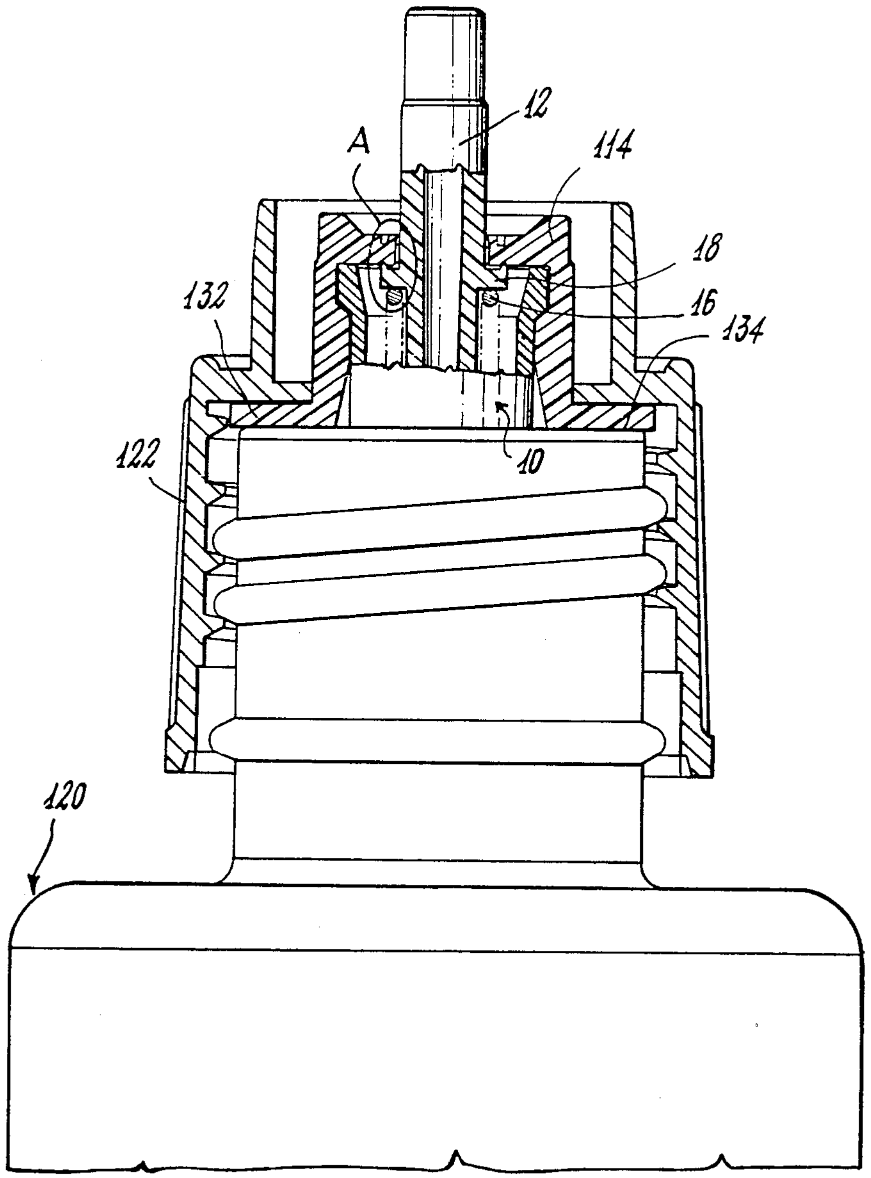
FIG. 2 is a section analogous to FIG. 1 but showing a plastic ring nut screwed onto the bottle neck.

FIG. 2 shows a second embodiment of the seal device according to the invention. This differs from the preceding only in that the closure element 114 is in a form able to adapt to a plastic ring nut 122 screwed onto the neck of the bottle 120 as a replacement for the metal ring 22 of FIG. 1. The remainder of FIG. 2 is identical to FIG. 1.

Those elements of FIG. 2 identical to those of FIG. 1 are indicated by the same reference numerals, whereas similar elements have the same reference numerals plus one hundred.

The detail A indicated in FIG. 2 is identical to that of FIG. 1 and is therefore shown in FIG. 3.

Obviously, numerous modifications and variations of the present invention are possible in light of the above teachings. It is therefore to be understood that within the scope of the appended claims, the invention may be practiced otherwise than as specifically described herein.

We claim:

1. A seal device for hand pumps for dispensing paste or liquid products from a bottle containing such products, which comprises:

a pump stem;

a pump spring;

an upper closure element of the pump which comprises elastically deformable plastic material wherein a hole is formed in said closure element;

an annular lip member provided in said hole, extending towards an interior portion of said hole defining a circular aperture of a diameter slightly less than that of a corresponding part of said pump stem to form a seal between the stem and closure element during pump operation, while allowing the stem to slide in opposite axial directions, wherein said pump stem includes a stem collar against which said pump spring acts, said stem collar having on an upper face thereof a coaxial annular seal rib which engages against a lower face of the closure element under thrust action of the pump spring so as to provide a seal when the pump is being operated.

2. A seal device as claimed in claim 1, which comprises a ring member for fixing the closure element to a mouth portion of the bottle wherein the closure element comprises a coaxial annular flange extending radially from said stem to form the seal gasket between the mouth portion of the bottle and the ring member.

3. A seal device as claimed in claim 1 or 2, wherein the pump upper closure element comprises a material selected from the group consisting of polythene or polythene-copolymer.

* * * * *